Sept. 11, 1928.
E. TURNQUIST
ELECTRIC LAMP
Filed Feb. 3, 1927
1,684,292
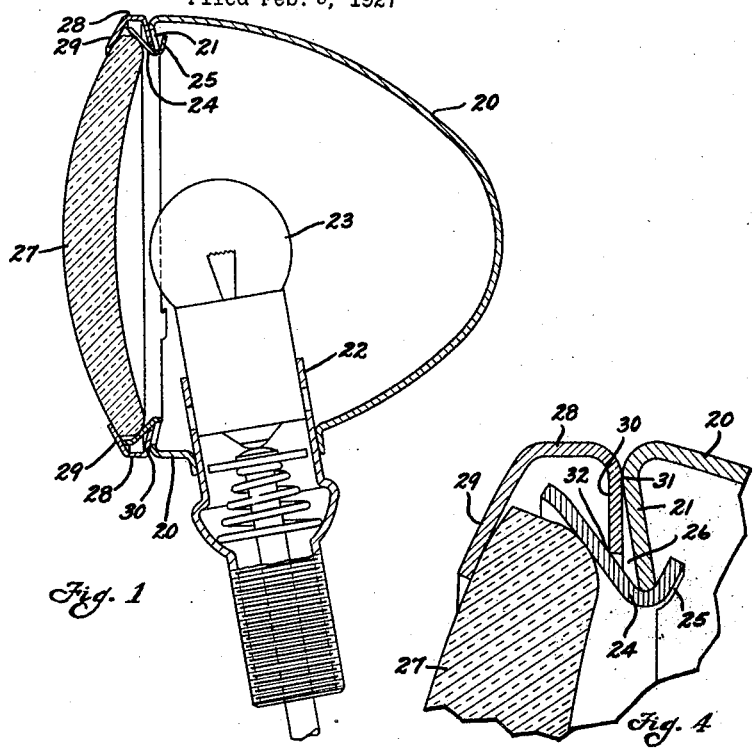
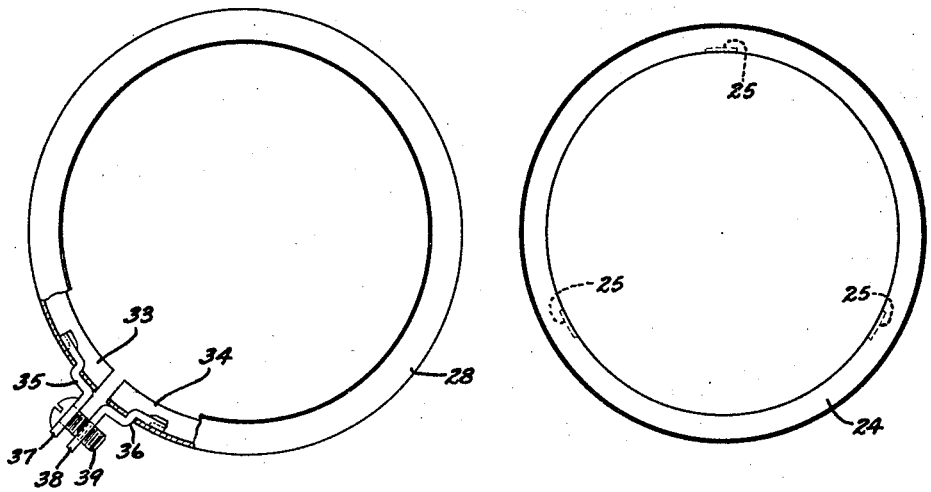
Fig. 1
Fig. 4
Fig. 2
Fig. 3
Inventor
Edward Turnquist
By Spencer Hardman & Fehr
his Attorneys Patented Sept. 11, 1928.

1,684,292

UNITED STATES PATENT OFFICE.

EDWARD TURNQUIST, OF ANDERSON, INDIANA, ASSIGNOR TO DELCO-REMY CORPORATION, OF DAYTON, OHIO, A CORPORATION OF DELAWARE.

ELECTRIC LAMP.

Application filed February 3, 1927. Serial No. 165,698.

This invention relates to improvements in lamps, and particularly to lamps used on motor vehicles.

It is among the objects of the present invention to provide a lamp of simple structure and design, including inexpensive means for securing the glass panel or lens on the lamp body so that rattling, due to vibration, is substantially eliminated.

Further objects and advantages of the present invention will be apparent from the following description, reference being had to the accompanying drawing, wherein a preferred embodiment of one form of the present invention is clearly shown.

In the drawing:

Fig. 1 is a cross sectional view of the lamp;
Fig. 2 is a detail view of the molding;
Fig. 3 is a detail view of the rim; and
Fig. 4 is an enlarged fragmentary sectional view showing the relative locations of the lamp body, molding and rim, with the lens clamped in position on the lamp.

Referring to the drawing, the numeral 20 designates a lamp body, any suitable size and shape, which is provided with an inwardly extending annular flange 21. A suitable receptacle 22, of any standard construction, is supported in the lamp body, which receptacle or socket provides a holder for the electric lamp 23.

A resilient, bell-shaped rim 24 has a plurality of lugs 25 formed in the edge of the smaller diameter end, said lugs being bent over the flange 21 of the lamp body to secure the rim on said body. Between the flared wall of the rim 24 and the flange 21 of the lamp housing, there is thus provided an inwardly tapering, annular channel 26, as shown in the Figs. 1 and 4.

The lens 27 engages with the flared wall portion of the rim 24. A contractible molding 28, in the form of an annulus, having inwardly extending flanges 29 and 30, surrounds the lens 27, the flange 29, termed the outer flange of the molding, engaging with the lens 27 at points substantially oppositely disposed from the points of engagement between the lens and the rim 24. The other, or inner flange 30 of the molding 28, extends into the tapered channel 26, one portion engaging the flange 21 of the housing at a point indicated by the numeral 31 (Fig. 4), the edge of the flange engaging the rim 24 at a point indicated by the numeral 32.

In Fig. 2 a detail view of the molding 28 shows it to be split, thus providing the ends 33 and 34. Adjacent each end of the split molding there is provided an aperture for receiving lugs 35 and 36, the former extending into the aperture formed in the end 33, the latter into the aperture of portion 34 of the molding. These lugs are provided with ears 37 and 38 respectively, and are shaped to coincide with the curvature of the molding when they are in position in the molding, both ears being apertured, the aperture of the ear 38, however, being provided with screw threads for receiving the screw 39 which extends through the aperture in the ear 37, said screw having a head engaging with said ear. Operation of the screw 39 in one direction will tend to draw the ends 33 and 34 together and thus contract the molding. Contraction of the molding draws the flange 30 deeper into the tapered channel 26 and thus the engagement of the flange 30 with the flange 21 at the point 31 will tend to force said flange 30 away from the flange 21 and toward the rim 24. The end of flange 30 engaging with the rim 24 at the point indicated by the numeral 32, exerts a pressure upon the rim 24, thus forcing it into pressing engagement with the lens 27 and consequently forcing the lens into tight engagement with the flange 29 of the molding. From this it may be seen that contraction of the molding 28 will increase the gripping effect of the flange 29 and the rim 24 on opposite sides of the lens 27 and thus hold the lens tightly therebetween, substantially eliminating the possibility of rattling, due to vibration. Any tendency of the rim to loosen on the headlight body and cause rattling may be overcome by tightening of the screw 39 to contract the molding, thereby causing the flange 30 to exert a wedging effect between the rim 24 and the flange 21 of the lamp body.

One advantage of the present invention is that lenses of varying thickness and diameter may be utilized without changing the size or shape of any of the parts comprising the lamp.

While the form of embodiment of the present invention as herein disclosed, constitutes a preferred form, it is to be understood that other forms might be adopted, all coming within the scope of the claims which follow.

What is claimed is as follows:

1. A lamp, comprising in combination, a lamp body; a rim secured to said lamp body; a lens engaged by said rim; and a contractible molding having one portion engaging the lens and another portion engaging the lamp body and rim, said latter molding portion exerting pressure upon the rim to force it into pressing engagement with the lens and in turn force the lens against the first mentioned portion of the molding when said molding is contracted.

2. A lamp, comprising in combination, a lamp body; a resilient rim having one portion secured to the lamp body; a lens engaging the other portion of the rim; and a contractible molding in the form of an annulus having outer and inner flanges, the former engaging the lens, the inner flange engaging the lamp body and rim and adapted, when the molding is contracted, to exert pressure upon the rim to force it into pressing engagement with the lens whereby the lens is forced into tight engagement with the outer flange of the molding.

3. A lamp, comprising in combination, a lamp body; a resilient, bell-shaped rim having lugs in the edge of its smaller diameter end, for securing the rim to the lamp body; a lens engaging the rim; and a contractible molding in the form of an annulus having inwardly extending flanges, the one of which engages the lens, the other being wedged between the rim and lamp body whereby, when the molding is contracted, said flange will exert a contracting force upon the rim to force it into pressing engagement with the lens and thus press the lens against the first mentioned molding flange.

4. A lamp, comprising in combination, a lamp body, having an inwardly extending annular flange; a resilient, bell-shaped rim having lugs in the edge of the smaller diameter end by means of which the rim is secured to the lamp body, thereby providing an inwardly tapering, annular channel defined by the rim and lamp body flange; a lens engaging the rim; and a moulding, in the form of an annulus having inwardly extending flanges, one of which engages the lens at a point substantially oppositely disposed from the point of engagement of the lens with the rim, the other flange extending into the tapering annular channel and engaging the flange of the lamp body and the rim, whereby, when the molding is contracted, the one flange thereof will exert a contracting pressure upon the rim and a wedging pressure upon the lamp body flange, to cause the lens to be gripped tightly between the rim and the one molding flange.

In testimony whereof I hereto affix my signature.

EDWARD TURNQUIST.